(12) United States Patent
Le Meur

(10) Patent No.: US 10,921,415 B2
(45) Date of Patent: Feb. 16, 2021

(54) METHOD FOR DETERMINING THE DIRECTION OF ARRIVAL IN PRESENCE OF ALIASING AND ASSOCIATED DEVICE

(71) Applicant: THALES, Courbevoie (FR)

(72) Inventor: Anne Le Meur, Elancourt (FR)

(73) Assignee: THALES, Courbevoie (FR)

( * ) Notice: Subject to any disclaimer, the term of this patent is extended or adjusted under 35 U.S.C. 154(b) by 234 days.

(21) Appl. No.: 16/063,495

(22) PCT Filed: Dec. 23, 2016

(86) PCT No.: PCT/EP2016/082649
§ 371 (c)(1),
(2) Date: Jun. 18, 2018

(87) PCT Pub. No.: WO2017/109219
PCT Pub. Date: Jun. 29, 2017

(65) Prior Publication Data
US 2019/0004140 A1 Jan. 3, 2019

(30) Foreign Application Priority Data
Dec. 23, 2015 (FR) ...................... 15 02685

(51) Int. Cl.
*G01S 3/02* (2006.01)
*G01S 3/48* (2006.01)
(Continued)

(52) U.S. Cl.
CPC ............... *G01S 3/48* (2013.01); *G01S 3/043* (2013.01); *G01S 3/143* (2013.01); *G01S 3/46* (2013.01);
(Continued)

(58) Field of Classification Search
CPC . G01S 3/043; G01S 3/143; G01S 3/46; G01S 3/48; G01S 3/465; G01S 3/50; G01S 3/72
(Continued)

(56) References Cited

U.S. PATENT DOCUMENTS 6,127,974 A * 10/2000 Kesler ...................... G01S 3/46
342/417
6,700,536 B1 * 3/2004 Wiegand ................. G01S 3/023
342/417
(Continued)

FOREIGN PATENT DOCUMENTS

WO 2015158615 A1 10/2015

OTHER PUBLICATIONS

Chepuri, Sundeep Prabhakar, et al., "Multiple Hypothesis Testing for Compressive Wideband Sensing", Signal Processing Advances in Wireless Communications (SPAWC), 2012 IEEE 13th International Workshop on, IEEE, Jun. 17, 2012, pp. 590-594.
(Continued)

*Primary Examiner* — Chuong P Nguyen
(74) *Attorney, Agent, or Firm* — Duane Morris LLP

(57) ABSTRACT

The invention relates to the method for determining the direction of arrival of radio signals in the presence of aliasing, the method using an interferometric array (12) with four antennas (16) with identical diagrams, and sampling by two distinct sampling frequencies per antenna (16), the method also comprising, for all of the detected wanted signals:
the determination of the interference situation for each antenna (16),
for the antennas (16) other than the antenna (16) affected by the double interference, the phase of the wanted signal, and
(Continued)

Figure 1:
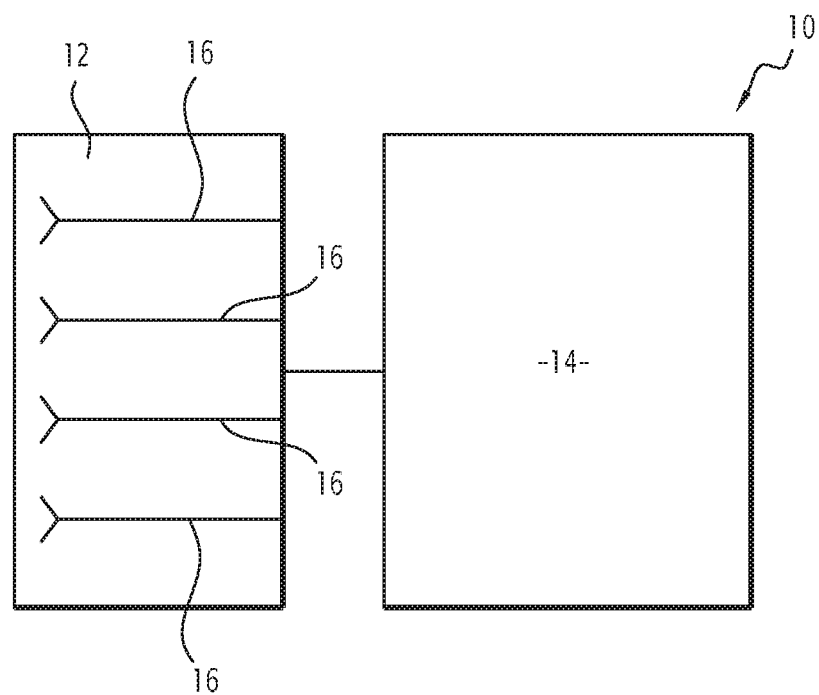

for any antenna (16) affected by the double interference, the estimate of the phase of the wanted signal.

11 Claims, 1 Drawing Sheet

(51) Int. Cl.
    *G01S 3/04*     (2006.01)
    *G01S 3/46*     (2006.01)
    *G01S 3/72*     (2006.01)
    *G01S 3/14*     (2006.01)
    *G01S 3/50*     (2006.01)
    *H04B 1/10*     (2006.01)

(52) U.S. Cl.
    CPC ............. *G01S 3/72* (2013.01); *G01S 3/465* (2013.01); *G01S 3/50* (2013.01); *H04B 1/1027* (2013.01)

(58) Field of Classification Search
    USPC ........................................ 342/417, 437, 445
    See application file for complete search history.

(56) References Cited

U.S. PATENT DOCUMENTS

| | | | | |
|---|---|---|---|---|
| 6,836,245 B2* | 12/2004 | Kishigami | ........... | G06K 9/0057 342/417 |
| 6,898,235 B1* | 5/2005 | Carlin | ........... | H04B 1/001 342/147 |
| 6,985,107 B2* | 1/2006 | Anson | ........... | G01S 3/48 342/451 |
| 7,358,891 B2* | 4/2008 | Struckman | ........... | G01S 3/146 342/148 |
| 7,436,351 B2* | 10/2008 | Struckman | ........... | G01S 3/146 342/148 |
| 7,477,192 B1* | 1/2009 | Haff | ........... | G01S 3/30 342/374 |
| 8,466,829 B1* | 6/2013 | Volman | ........... | G01S 3/48 342/147 |
| 10,386,397 B2* | 8/2019 | Cornic | ........... | G01S 7/021 |
| 2005/0007278 A1* | 1/2005 | Anson | ........... | G01S 3/48 342/451 |
| 2005/0259006 A1* | 11/2005 | Kim | ........... | G01S 3/74 342/377 |
| 2006/0087475 A1* | 4/2006 | Struckman | ........... | G01S 5/04 342/451 |

OTHER PUBLICATIONS

Dominguez-Jitnenez, M. E., et al., "Analysis and Design of Multirate Synchronous Sampling Schemes for Sparse Multiband Signals", Signal Processing Conference (EUSIPO), 2012 Proceedings of the 20th European, IEEE, Aug. 27, 2012, pp. 1184-1188.

Mishali, M., et al., "From Theory to Practice: Sub-Nyquist Sampling of Sparse Wideband Analog Signals", IEEE Journal of Selected Topics in Signal Processing, IEEE, US, vol. 4, No. 2, Apr. 1, 2010, pp. 375-391.

Venkataramani, Raman, et al, "Optimal Sub-Nyquist Non-Uniform Sampling and Reconstructions for Multiband Signals", IEEE Transactions on Signal Processing IEEE Service Center, New York, NY, US, vol. 49, No. 10, Oct. 1, 2010.

French Search Report issued in connection with French Application No. FR 1502685, dated Oct. 21, 2016, 4 pages.

International Search Report issued in connection with International Patent Application No. PCT/EP2016/082649, dated Apr. 11, 2017, 4 pages.

\* cited by examiner

METHOD FOR DETERMINING THE DIRECTION OF ARRIVAL IN PRESENCE OF ALIASING AND ASSOCIATED DEVICE

CROSS-REFERENCE TO RELATED APPLICATIONS

This application is a U.S. national stage application under 35 U.S.C. § 371 of International Application No. PCT/EP2016/082649, filed Dec. 23, 2016, which claims priority to French patent application No. 1502685, filed Dec. 23, 2015, the entireties of which are incorporated herein by reference.

The present invention relates to a method for determining the direction of arrival in the presence of aliasing and an associated device.

In general, the present invention relates to the field of the broadband passive reception of electromagnetic signals (radar or communication signals).

It is in particular desired to determine the direction of arrival (DOA).

To that end, a phase goniometry interferometer intended to capture electromagnetic signals and calculate their direction of arrival is used. The successive distances between antennas respect clearly determined known proportions in order to provide an unambiguous direction of arrival measurement of the signal.

For technological reasons, in the context of broadband listening to electromagnetic signals, it is generally not possible to perform sampling at a frequency greater than twice the bandwidth occupied by all of the analog (called broadband) signals, i.e., to respect the Nyquist criterion. This in fact requires ultrafast digital converters, which do not satisfy the weight/volume/consumption constraints, when they are not completely inaccessible for the bandwidths one wishes to process.

When the Nyquist criterion is not respected, the signals from all of the Nyquist band alias in the first Nyquist band, and are capable of generating mixtures, which greatly reduces the performance of the receiver. In order to estimate the parameters of these signals correctly, and in particular the DOA, a receiver is used here with M distinct sampling frequencies, but not respecting the Nyquist criterion, M being an integer.

The careful choice of the number M of sampling frequencies and their values makes it possible to eliminate the frequency ambiguities, i.e., to guarantee the existence of a bijective correspondence between an analog frequency in the total band (which we will call radiofrequency or true frequency) and a M-uplet of frequencies taken in the first Nyquist band of each of the M samplings (which we will call M-uplet of aliased frequencies).

When a single signal is present in the broadband, it is possible to perform the detection using a traditional detection method in the presence of thermal noise. It is also possible to calculate the direction of arrival of the signal.

The case where the complex spectrum of the signal is superimposed on one of its aliases must be handled specially. For a real signal whose frequencies verify $f_{min} \leq |f| \leq f_{max}$, and for a given sampling frequency $f_m$, a sufficient condition for there not to be superposition is for there to be an integer k such that $$k\frac{f_m}{2} < f_{min} \text{ and } f_{max} < (k+1)\frac{f_m}{2}.$$

To simplify, one may say that there is no superposition when the rest of the whole division of the carrier frequency of the signal by $$\frac{f_m}{2}$$

is greater than the instantaneous band of the signal, or, in other words, when the carrier frequency of the signal is "far enough" from the multiples of the half-sampling frequency.

However, in a passive system, the received signal is unknown and compliance with this condition is not guaranteed.

When several signals are present at the same time in the broadband, the situation is further complicated, because two simultaneous, but frequentially separated signals may be superimposed in time and frequency after aliasing. These mixtures are of a particular type: they occur for a sampling frequency, or simultaneously for several sampling frequencies, but not for all of them, due to the uniqueness of the correspondence between the set of radio frequencies and the set of frequency M-uplets.

There is therefore a need for a method for determining the direction of arrival of signals emitted by a radio source making it possible to resolve the aforementioned drawbacks, and in particular to handle situations involving several signals.

To that end, the present description in particular relates to the method for determining the direction of arrival of radio signals in the presence of aliasing, the method using an interferometric array with four antennas with identical diagrams, and sampling by two distinct sampling frequencies per antenna, the aliasing being such that in the time/frequency representation of a signal, the signal being called wanted signal, a maximum of one antenna is affected by an interference phenomenon on its two sampling frequencies, the phenomenon being due to a first external interference, and a second interference being either a second external interference, or an internal interference. The method comprises the reception of a signal by each antenna, the sampling of the signals received on each of the four antennas (16) according to two sub-Nyquist frequencies forming the set $\{f_1, \text{perm}(f_1); f_2 \text{ perm}(f_2); f_3 \text{ per}(f_3); f_4, \text{perm}(f_4)\}$ where $f_1, f_2, f_3$ and $f_4$ are four distinct sub-Nyquist frequencies and perm is a permutation of the set $\{f_1, f_2, f_3 \ f_4\}$, such that the signals received on two distinct antennas are sampled by two distinct pairs of sub-Nyquist sampling frequencies. The method comprises the spectral analysis by application, during a synchronous acquisition period over all of the samplings, of a discrete Fourier transform to obtain 2P time-frequency grids, each element of a grid containing a complex vector called measurement, the detection of the presence or absence of wanted signal at a plurality of frequencies. The method also comprising, for all of the detected wanted signals, the determination of the interference situation for each antenna, for the antennas other than the antenna affected by the double interference, the extraction of the phase of the wanted signal, and for any antenna affected by the double interference, the estimate of the phase of the wanted signal, comprising the first estimate of a first pair of candidate phases $\xi_1^1$ and $\xi_1^2$, from the measurement resulting from the mixture of the wanted signal, the first interference signal, and noise, the second estimate of a second pair of candidate phases z and $\xi_2^1$ from the measurement $\xi_2^2$ resulting from the mixture of the wanted signal, the second interference, and noise, and the selection of phase values from among the candidate phases to obtain an estimate of the phase of the wanted signal on the antenna affected by the double interference.

According to specific embodiments, the method comprises one or more of the following features, considered alone or according to any technically possible combinations:

the plurality of frequencies of the detection are analog frequencies regularly spaced apart by a frequency interval that is the inverse of the acquisition time.

the first estimate of first candidate phases includes calculating the following equations:

$$\xi_1^1 = \alpha + \text{Arccos}\frac{\rho^2 + r^2 - r_1^2}{2\rho r}$$

and $$\xi_1^2 = \alpha - \text{Arccos}\frac{\rho^2 + r^2 - r_1^2}{2\rho r}$$

Where:
$\alpha$ is the argument of the measurement z,
$\rho$ is the modulus of the measurement z
r is the modulus of the wanted signal, and
$r_1$ is the modulus of the first interference signal.

the second estimate of a second pair of candidate phases includes calculating equations based on the nature of the second interference, when the second interference is an internal interference, the equations being $\xi_2^1{}_2 = \text{Arc cos}(y/2r)$ and $\xi_2^2 = -\text{Arccos}(y/2r)$ Where:
r is the modulus of the wanted signal, and
y is the real part of the measurement $\zeta$ when the second interference is an external interference, the equations being $$\xi_2^1 = \alpha + \text{Arccos}\frac{\rho_2^2 + r^2 - r_2^2}{2\rho_2 r}$$

and $$\xi_2^2 = \alpha - \text{Arccos}\frac{\rho_2^2 + r^2 - r_2^2}{2\rho_2 r}$$

Where:
$\alpha$ is the argument of the measurement $\zeta$,
$\rho_2$ is the modulus of the measurement $\zeta$,
r is the modulus of the wanted signal, and
$r_2$ is the modulus of the second interference signal.

the selection of the phase values includes associating candidate phases to determine the two phase values corresponding to a shared value representing the true phase, to obtain two associated phase measurements, and estimating the phase by merging the two associated phase measurements.

the association of the phases is done using a rule, the rule being the following rule: $\xi_1^i$ and $\xi_2^j$ are associated if the pair $(\xi_1^i, \xi_2^j)$ is the pair from among the four pairs $(\xi_2^k, \xi_2^l)$ that verifies $$|\xi_1^i - \xi_2^j| = \min_{k,l}|\xi_1^k - \xi_2^l|.$$

the estimate of the phase comprises calculating the following expression:

$$\hat{x} = \frac{\sigma_2^2}{\sigma_1^2 + \sigma_2^2}\xi_1 + \frac{\sigma_1^2}{\sigma_1^2 + \sigma_2^2}\xi_2$$

Where:
$\hat{x}$ is the estimate of the phase of the wanted signal;
$\xi_1$ is equal to the $\xi_1^i$ obtained in the association step;
$\xi_2$ is equal to the $\xi_2^j$ obtained in the association step;
$\sigma_1^2$ is the variance of $\xi_1$, defined by $$\sigma_1^2 = \frac{\sigma^2}{\rho^2} \cdot \frac{4\rho^2 r_1^2}{4\rho^2 r^2 - (\rho^2 + r^2 - r_1^2)^2},$$

and
$\sigma_2^2$ is the variance of $\xi_2$, defined:
when the second interference is internal, by $$\sigma_2^2 = \frac{\sigma^2}{4r^2 - y^2},$$

or
when the second interference is external, by $$\sigma_2^2 = \frac{\sigma^2}{\rho_2^2} \cdot \frac{4\rho_2^2 r_2^2}{4\rho^2 r^2 - (\rho_2^2 + r^2 - r_2^2)^2}$$

the method further includes calculating differential phases and calculating the direction of arrival from differential phases.

The present description also relates to a device for determining the direction of arrival of radio signals in the presence of aliasing, the device comprising an interferometric array with four antennas with identical diagrams, and sampling by two distinct sampling frequencies per antenna, each antenna being able to receive a signal called received signal, the aliasing being such that in the time/frequency representation of a signal, the signal being called wanted signal, a maximum of one antenna is affected by an interference phenomenon on its two sampling frequencies, the phenomenon being due to a first external interference, and a second interference being either a second external interference, or an internal interference, a controller suitable for carrying out the sampling, the spectral analysis, the detection of the presence or absence of wanted signal, then, for each detected wanted signal, the determination of the interference situation for each antenna, the extraction of the phase of the wanted signal on the antennas other than any antenna affected by the double interference and the estimate of the phase of the antenna affected by the double interference of a method as previously described.

According to one embodiment, the controller includes a sampling unit able to carry out the sampling of the method as previously described and a computer able to carry out the spectral analysis, the detection of the presence or absence of wanted signal, then, for each detected wanted signal, the determination of the interference situation for each antenna, the extraction of the phase of the wanted signal for the antennas other than the antenna affected by the double interference and the estimate of the phase of the wanted signal for any antenna affected by the double interference of the method as previously described.

According to one embodiment, the sampling unit includes two analog-digital converters per antenna.

Figure 2:
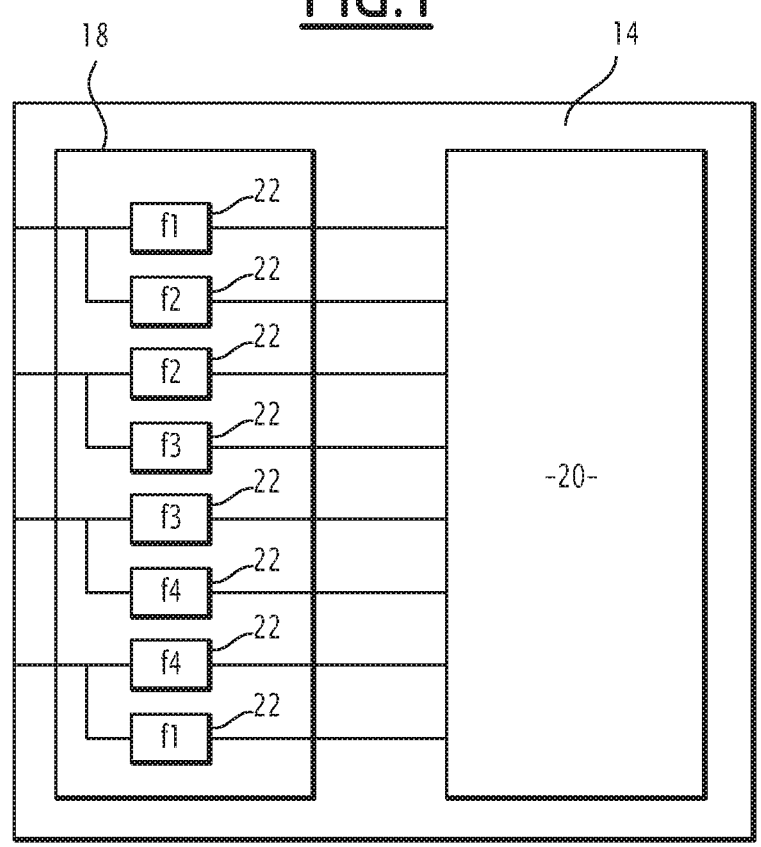

Other features and advantages of the invention will appear upon reading the following description of embodiments of the invention, provided as an example only and in reference to the drawings, which are:

FIG. 1, a schematic view of a device for determining the direction of arrival of radio signals in the presence of aliasing, and FIG. 2, a schematic view of a part of the device of FIG. 1

A device 10 for determining the direction of arrival of radio signals in the presence of aliasing is illustrated in FIG. 1.

The device 10 comprises an interferometric array 12 and a controller 14.

The interferometric array 12 is an array with P antennas 12 with identical diagrams.

The choice of P=M=4 makes it possible to obtain an angularly and frequentially unambiguous interferometer over the entire broadband.

Each antenna 16 is able to receive a signal, called received signal.

Hereinafter, each antenna 16 is also referred to as "sensor".

The controller 14 is able to process each signal received by the antennas 16 to obtain the direction of arrival in the presence of aliasing.

To that end, the controller 14 is able to carry out a method for determining the direction of arrival of radio signals in the presence of aliasing.

One example controller 14 is illustrated schematically in FIG. 2.

The controller 14 includes a sampling unit 18 and a computer 20.

The sampling unit 18 is able to sample, according to two distinct sub-Nyquist frequencies, each signal received by an antenna 16, such that each antenna 16 includes two measuring channels.

One thus has two sets of sampling frequencies. The two sets are chosen so as to form two permutations of the same quadruplet of sub-Nyquist frequencies, so that two distinct antennas 16 are not associated with the same pair of sampling frequencies.

In other words, the signals received on each of the 4 antennas are sampled according to two frequencies forming the set $(f_1, \text{perm}(f_1); f_2, \text{perm}(f_2); f_3, \text{perm}(f_3); f_4, \text{perm}(f_4))$, where $f_1$, $f_2$, $f_3$, $f_4$ are the four distinct sub-Nyquist frequencies and perm is a permutation of the set $\{f_1, f_2, f_3, f_4\}$, such that the signals received on two distinct antennas are sampled by two distinct pairs of sub-Nyquist sampling frequencies.

One thus has two measuring channels per antenna 16. Each of the four sampling frequencies is shared by two measuring channels. The two measuring channels sharing the same sampling frequency are called sampling channel.

The sampling module 18 includes two analog-digital converters 22 per measuring channel.

In the example of FIG. 2, the first analog-digital converter 22 of the first antenna 16 is able to sample the signal at a first sampling frequency $f_1$.

The second analog-digital converter 22 of the first antenna 16 is able to sample the signal at a second sampling frequency $f_2$.

The first analog-digital converter 22 of the second antenna 16 is able to sample the signal at the second sampling frequency $f_2$.

The second analog-digital converter 22 of the second antenna 16 is able to sample the signal at a third sampling frequency $f_3$.

The first analog-digital converter 22 of the third antenna 16 is able to sample the signal at the third sampling frequency $f_3$.

The second analog-digital converter 22 of the third antenna 16 is able to sample the signal at a fourth sampling frequency $f_4$.

The first analog-digital converter 22 of the fourth antenna 16 is able to sample the signal at the fourth sampling frequency $f_4$.

The second analog-digital converter 22 of the fourth antenna 16 is able to sample the signal at the first sampling frequency $f_1$.

It is hypothesized that the narrowband nature and the density of the signals in the environment are such that in the time/frequency representation of the signal (called wanted), the most complex interference situation is a double interference situation occurring on two distinct sampling frequencies (internal interference and external interference or two external interferences).

Consequently, for a given signal (considered to be the wanted signal), the interference situation is due either to internal interference or to external interference, or to internal interference and external interference on two distinct sampling frequencies, or to two external interferences on two distinct sampling frequencies. In the case of two interferences, the device 10 guarantees that for any signal in the broadband, the double interference situation occurs on a maximum of one antenna.

The computer 20 is able to process each measuring channel to obtain the direction of arrival.

The computer 20 is for example a processor or a programmable logic circuit.

The operation of the device for determining the direction of arrival in the presence of mixtures due to aliasing is now described.

The method includes a reception step, a sampling step, a spectral analysis step, a step for detecting the presence or absence of wanted signal at a plurality of frequencies, then, for all of the detected wanted signals, a step for determining the interference situation for each antenna, a step for extracting the phase of the wanted signal on the antennas not affected by the double interference and a step for estimating the phase of the wanted signal on any antenna affected by the double interference.

In the reception step, a signal is received by each antenna.

The receiver is an interferometer with P (P=4) aligned sensors with identical diagrams.

The signal measured at the output of the sensors forms a vector with dimension P=4, the component P of which is written according to the following equation 1:

$$s_p(t) = s(t)\exp^{i2\pi l_p \sin\theta/\lambda} + b_p(t), p=1,\ldots,P$$

Where:

$\theta$ is the angle formed by the propagation direction of the incident wave relative to the axis of the sensors, λ is the wavelength of the signal, $d_P$ is the x-axis of the sensor p on the axis, $b_P$ is the noise on the sensor p, and s is the amplitude of the signal, assumed to be narrow-band.

In the sampling step, the received signal is sampled for each antenna according to two distinct sub-Nyquist sampling frequencies to obtain two sub-Nyquist sampled signals.

As previously explained, the sampling step is carried out by the sampling unit 18.

The spectral analysis step makes it possible to obtain a time/frequency representation performing a mean adaptation at the band of the signals of interest.

In this step, on each measurement channel, a time/frequency grid is obtained by sliding spectral analysis on the sampled signal. These spectral analyses are done by moving, by regular pitches, a temporal support with duration $\Delta T_m$, and applying a bank of filters by Discrete Fourier transform (DFT) on this support. The results constitute a two-dimensional grid in which the $i_T^{ème}$ column represents the result of the $i_T^{ème}$ spectral analysis, and in which the box or element with index $(i_T, i_F)$ contains a complex property code measurement, representing the $i_F^{ème}$ channel of the $i_T^{ème}$ spectral analysis. To simplify, the double time and frequency index is next replaced by a single index n.

The model therefore becomes the following equation 2, for a measurement n on a measuring channel V:

$$z_{v,n} = s_n e^{i2\pi d_{p(v)}\alpha/\lambda} + w_{v,n}$$

Where:

p(v) is the sensor on which the measurements of the channel v are done, $s_n$ designates the Discrete Fourier Transform of the $N_m$ samples of s for the time interval and the frequency interval of the considered box; $s_n$ is independent of the sensor, $w_{v,n}$ designates the Discrete Fourier Transform of the noise on the antenna p(v), $d_{p(v)}$ is the distance of the sensor p(v) from a sensor taken arbitrarily as reference, n is a double index traveling the time and frequency.

In the rest of the following, it is assumed that the signal-to-noise ratio is high.

Under these conditions, the representation of equation 2 can be replaced by a polar decomposition. In the general case (i.e., without interferences), it is then shown that the moduli of the $z_p$ are independent of α and are noised by a noise that is independent of the phase noise. One concludes from this that the phases (arguments modulo 2π) of the $z_v$ are sufficient for the estimate of α, which is the problem that one seeks to solve.

To simplify, equation 1 can be rewritten as:

$$z_{v,n} = |s_n|e^{i2\pi d_{p(v)}\sin\theta/\lambda} e^{i\arg s_n} + w_{v,n} = r_n e^{i\alpha} + w_{v,n}$$

Which is written according to equation 3:

$$z = re^{ix} + w$$

The signals of interest are high-frequency and narrow-band real signals. They are characterized by the fact that their spectrum is made up of two spectral patterns with separate support, respectively on R+ and R−, and made up of a limited number of consecutive intervals, typically two consecutive intervals.

In the general case, there is therefore no interaction between the two spectral patterns of the real analog signal. Nevertheless, after subsampling, this is no longer verified when the radiofrequency is close to a multiple of the Nyquist frequency, since there is then a superposition, in the first Nyquist band, between a reply from the positive part and a reply from the negative part of the spectrum. In the case where the number of points of the Fourier Transform is even, the resulting measurement is the sum of the two spectral patterns, which are conjugated to one another. This phenomenon is called internal or intra-signal interference.

When several signals are present simultaneously in the broadband, there may also be an interaction there, if at least two signals occupy frequencies for which the rest of the Euclidean division by the withdrawn frequency band is identical. A superposition is then observed, in the first Nyquist band, of a reply from the positive part (or the negative part) of the spectrum of the first signal with a reply from the positive part (or the negative part) of the spectrum of the second signal. This phenomenon is called external or inter-signal interference.

In order to obtain synchronous information with a same spectral resolution, a beginning and end of acquisition shared by all of the DFTs are imposed. Consequently, the sampling frequencies $f_m$ and the number of points $N_m$ of each DFT verify the following equation 4:

$$N_m \cdot T_m = \Delta T_m = \Delta T = 1/\Delta F$$

Where:

$N^m$ represents the number of sampling points at the frequency $f_m$, $T_m$ represents the sampling period (inverse of the sampling frequency $f_m$), and $\Delta F$ then represents the spectral resolution shared by all of the measuring channels.

Equation 4 implies that the number of points $N_m$ is different from one sampling to the next. This choice of sampling frequencies $f_m$ such that the sampling frequencies are multiples of the band $\Delta F$ makes it possible that from one sampling to another, the spectrums of the signals are offset by a whole number of multiples of $f_m$, therefore by a whole number of multiples of $\Delta F$, i.e., by a whole number of Discrete Fourier Transform filters.

Furthermore, the frequencies $f_m$ are close to one another, since they are chosen to be close to the limit achievable by the technology, in order to limit aliasing. The number of aliases for a frequency $f_m$, denoted $r_m$, which is equal to $$\frac{2B}{f_m},$$

is therefore close to the mean value of the $r_m$, which we will simply call coefficient r.

Another consequence of equation 4 is that the true frequency of a signal cannot be a multiple of two different sampling half-frequencies.

Indeed, if a true frequency exists as is, for two sampling frequencies (for example, but without losing generality, $f_1$ and $f_2$):

$$f = k_1 f_1/2 = k_2 f_2/2$$

Where $k_1$ and $k_2$ are two integers.

One then obtains $k_1 f_1 = k_2 f_2$,

Since $N_1 T_1 = N_2 T_2$, one obtains $f_2 = f_1 N_2/N_1$, and therefore: $k_1 f_1 = k_2 f_1 N_2/N_1$, from which: $k_1 = k_2 N_2/N_1$.

Therefore:

$$k_1 = k_2 \frac{N_1 + N_2 - N_1}{N_1} = k_2 + k_2 \frac{N_2 - N_1}{N_1}.$$

In order for k to be an integer, it is necessary for $$k_2 \frac{N_2 - N_1}{N_1}$$

to be an integer.

One may assume, without losing generality, that $N_2 > N_1$. Therefore, $$k_2 \frac{N_2 - N_1}{N_1}$$

is an integer greater than or equal to 1, since $N_2 - N_1 \neq 0$. Therefore, $$k_2 \geq \frac{N_1}{N_2 - N_1}.$$

Since the $N_m$ are significantly greater than the number of aliases r, and the $N_m$ are close to one another (since the $f_m$ are close to one another), $k_2$ is large in front of r, therefore the true frequencies that may be multiples of two different sampling half-frequencies are outside the broadband.

From all this, it results that, if, for a given radiofrequency, an internal interference phenomenon occurs in a sampling channel, due to the superposition of the spectrum on one of its own replies, then the phenomenon occurs in this sampling channel alone.

Likewise, it is possible to show that if a given radiofrequency is superimposed, after aliasing, in a sampling channel, with another radiofrequency, then this superposition occurs in this sampling channel only.

Regarding the mixtures of three signals, one uses the fact that the signals are narrowband, and therefore sparse in frequency, which makes it possible to neglect cases where, during the acquisition duration $\Delta T$, a signal is subject to interference by more than two other signals at the same time. One will also neglect the possibility that during the acquisition period $\Delta T$, a signal is subject to interference by two signals at the same time on the same sampling frequency.

Thus, for all of the antennas, only four situations are possible.

According to a first situation, no sampling channel contains external interference, and no sampling channel contains internal interference.

According to a second situation, one of the sampling channels contains external or internal interference. Two antennas share this sampling frequency.

According to a third situation, one of the sampling channels (or $f_{m1}$ the corresponding sampling frequency) contains an external interference, and a second sampling channel (or $f_{m2}$ the corresponding sampling frequency) contains an internal interference, such that $m_2 \neq \text{perm}(m_1)$ and $m_1 \neq \text{perm}(m_2)$.

According to a fourth situation, one of the sampling channels (or $f_{m1}$ the corresponding sampling frequency) contains an external interference, and a second sampling channel (or $f_{m2}$ the corresponding sampling frequency) contains an internal or external interference, such that $m_2 = \text{perm}(m_1)$ or $m_1 = \text{perm}(m_2)$. Consequently, for one of the antennas (or A this antenna), there is interference on both measuring channels. For any given signal, in the broadband, this double interference relates to only one antenna, which will be called "antenna affected by the interference phenomenon for both sampling frequencies" or "antenna affected by the double interference".

Irrespective of the situation, it is assumed that one has a detection step that determines whether, for any radiofrequency of the broadband, defined at the spectral analysis resolution, a wanted signal is present or absent.

Such a function is for example obtained by the method described in the patent "Digital detection method" FR 1400935).

This detection step is followed by a step for determining the interference situation. This step consists of determining the aliased frequency quadruplets associated with each radiofrequency for which the presence of a signal has been detected, in order to determine whether certain quadruplets have shared values.

When the presence of a wanted signal has been detected for a given radiofrequency, this in particular makes it possible to determine whether, in the quadruplet of aliased frequencies that are associated with it, zero, one or several values are shared with another quadruplet of aliased frequencies associated with other detected signals, and therefore whether zero, one or several sampling channels have external interference.

In the extraction step, for the antennas other than the antenna affected by the double interference, the phase of the wanted signal is extracted.

In fact, in the first situation, on each measuring channel, it is possible to extract the phase of the wanted signal.

In the second situation, one of the sampling channels contains external or internal interference. Two antennas share this sampling frequency. The extraction step is for example carried out by exploiting, for each of the two antennas in question, the sampling frequency that does not contain interference; and, for the other antennas, which are not tainted by interference, either one of the two available measurements or both available measurements.

In the third situation, no antenna is subject to interference twice, such that the remarks for the second situation also apply.

As a reminder, situation 4 is a situation with double interference (interference on both measuring channels of a same antenna). The estimating step is carried out in situation 4. This step consists of estimating the phase of the wanted signal on the antenna that is affected by the double interference.

In this case, specific processing is proposed.

To that end, below, an example embodiment is described, then it is demonstrated that the proposed embodiment makes it possible to obtain an estimate of the phase of the wanted signal in the complex situation that is situation 4.

The step for estimating the phase comprises a sub-step for estimating the modulus of the wanted signal, a sub-step for estimating the modulus of the interference signal, a sub-step for a first estimate of a first pair of candidate phases, a sub-step for a second estimate of a second pair of candidate phases, a sub-step for associating/selecting candidate phases, a sub-step for merging the selected phases.

In the sub-step for estimating the modulus of the wanted signal, the modulus of the wanted signal is estimated using antennas other than the antenna affected by the double interference.

As an example, the estimate of the modulus of the wanted signal using antennas other than the antenna affected by the double interference is carried out, for example by calculating the modulus of a measurement not subject to interference (see equation 3), optionally by applying filtering (smoothing), since several measurements are available.

In the sub-step for estimating the modulus of the interference signal, the modulus of the interference signal is estimated using antennas other than the antenna affected by the double interference.

As an example, the estimate of the modulus of the interference signal using antennas other than the antenna affected by the double interference is carried out by calculating the modulus of a measurement of the interference signal (see equation 3), optionally by applying filtering (smoothing), since several measurements are available. Indeed, the interference itself is subject to interference at least twice, on two different frequencies.

In the sub-step for the first estimate of the candidate phases, a first pair of candidate phases $(\xi_1^1, \xi_1^2)$ is obtained from the measurement of the modulus of the wanted signal and the modulus of the interference signal.

For example, the sub-step for a first estimate of a first pair of candidate phases $(\xi_1^1, \xi_1^2)$ includes the calculation of the following equations:

$$\xi_1^1 = \alpha + \text{Arccos}\frac{\rho^2 + r^2 - r_1^2}{2\rho r}$$

and $$\xi_1^2 = \alpha - \text{Arccos}\frac{\rho^2 + r^2 - r_1^2}{2\rho r}$$

Where:
$\alpha$ is the argument of the measurement,
$\rho$ is the modulus of the measurement,
$r$ is the modulus of the wanted signal, and
$r_1$ is the modulus of the interference signal, In the sub-step for the second estimate of the candidate phases, a second pair of candidate phases $(\xi_2^1, \xi_2^2)$ is obtained from the measurement, and from the modulus of the wanted signal.

For example, the sub-step for a second estimate of a second pair of candidate phases $(\xi_2^1, \xi_2^2)$ includes the calculation of the following equations:

$$\xi_2^1 = \text{Arccos}(y/2r)$$

and $$\xi_2^2 = -\text{Arccos}(y/2r)$$

Where:
$r$ is the modulus of the wanted signal, and
$y$ is the real part of the measurement.

In the sub-step for association/selection of the candidate phases, phase values are selected from among the candidate phases.

To that end, the association/selection sub-step includes the association of the candidate phases in order to determine the two phase values corresponding to a shared value representing the real phase, and the selection of these two phase values.

The association of the phases is, according to one particular case, done using a rule, the rule being the following rule: $\xi_1^i$ and $\xi_2^j$ are associated if the pair $(\xi_1^i, \xi_2^j)$ is the pair from among the four pairs $(\xi_1^k, \xi_2^l)_{k \in \{1,2\}, l \in \{1,2\}}$ that verifies $$|\xi_1^i - \xi_2^j| = \underset{k,l}{\text{Min}}|\xi_1^k - \xi_2^l|.$$

The two associated $\xi_1^i$ and $\xi_1^j$ are selected.

In the sub-step for merging the selected phases, the estimate of the phase of the wanted signal is done by calculating the following expression:

$$\hat{x} = \frac{\sigma_2^2}{\sigma_1^2 + \sigma_2^2}\xi_1 + \frac{\sigma_1^2}{\sigma_1^2 + \sigma_2^2}\xi_2$$

Where:
$\hat{x}$ designates the estimate of the argument of the wanted signal,
$\xi_1$ is equal to the $\xi_1^i$ obtained in the association/selection step,
$\xi_2$ is equal to the $\xi_2^j$ obtained in the association/selection step;
$\sigma_1^2$ is the variance of $\xi_1$, defined by $$\sigma_1^2 = \frac{\sigma^2}{\rho^2} \cdot \frac{4\rho^2 r_1^2}{4\rho^2 r^2 - (\rho^2 + r^2 - r_1^2)^2},$$

and
$\sigma_2^2$ is the variance of $\xi_2$, defined by $$\sigma_2^2 = \frac{\sigma^2}{4r^2 - y^2}.$$

As will be demonstrated, the sub-steps for estimating the modulus of the wanted signal, estimating the modulus of the interference signal, a first estimate of a first pair of candidate phases, a second estimate of a second pair of candidate phases, associating/selecting candidate phases, for merging the selected phases, make it possible to obtain an estimate of the phase of the wanted signal in the fourth situation.

Let $r$ and $x$ respectively be the modulus and the argument of the wanted signal.

Let $r_1$ and $x_1$ be the modulus and the argument of the interference signal that come into play with the sampling frequency $f_{m1}$.

On the antenna A, after subsampling at the frequency $f_{m1}$, the measurement is expressed as a mixture of the wanted signal, the interference signal and noise according to the following equation 5:

$$z = re^{ix} + r_1 e^{ix} + u$$

The other cases, namely: the mixing of the wanted signal with the conjugate of the interference signal, the mixing of the conjugate of the wanted signal with the interference signal, the mixing of the conjugate of the wanted signal with the conjugate of the interference signal, are written and processed similarly.

On the antenna A, after subsampling at the frequency $f_{m2}$, one measures, in the case of internal interference, a mixture of the wanted signal, its conjugate, and noise, according to the following equation 6:

$$\zeta = re^{ix} + re^{-ix} x + v$$

Where: u,v are two independent samples of a complex Gaussian random variable, centered, with covariance $$\sigma^2 \begin{pmatrix} 1 & 0 \\ 0 & 1 \end{pmatrix}.$$

It should be noted that strictly speaking, u and v are not exactly independent. Their correlation coefficient is equal to the inverse of the number of frequency ambiguities.

It is proposed to estimate the phase x using the measurements of equations 5 and 6 assuming that r and $r_1$ are known, replacing r and $r_1$ by their estimate.

Furthermore, because the imaginary part of the signal $\zeta$ only contains noise, equation 6 is reduced to an equation 7:

$$y = Re(\zeta) = 2r\cos(x) + w$$

As a result, the parameter W is therefore real Gaussian, centered, and with variance $\sigma^2$.

To have an estimator of this phase x that is good on average, irrespective of $x_1$, it is considered that the phase $x_1$ is a random variable independent of the noise and equally distributed over the interval $[0, 2\pi[$.

In equation 5, the "noise" is thus expressed by the mathematical term $r_1 e^{ix_1} + w$. This random variable has a probability density expressed in the form of equation 8:

$$p(w_1, \varphi) = \frac{w_1}{2\pi\sigma^2} \exp\left(-\frac{r_1^2 + w_1^2}{2\sigma^2}\right) I_0\left(\frac{r_1 w_1}{\sigma^2}\right)$$

Where:
p is the probability density of the phase $x_1$
$w_1$ is the modulus of the complex number $r_1 e^{ix_1} + w$, and
$\varphi$ is the argument of the complex number $r_1 e^{ix_1} + w$.

The independence is noted between the modulus and the argument, the modulus following a modified Rayleigh law (Rice law) and the argument being equally distributed.

When $r_1^2 / 2\sigma^2 \gg 1$ (strong signal-to-noise ratio), the Bessel function $I_0(.)$ is approximated by the expression $I_0(z) = e^z \sqrt{2\pi z}$.

As a result, for equation 8:

$$p(w_1, \varphi) \approx \frac{w_1}{2\pi\sigma^2} \frac{1}{\sqrt{2\pi}} \frac{\sigma}{\sqrt{r_1 w_1}} \exp\left(-\frac{(w_1 - r_1)^2}{2\sigma^2}\right)$$

After simplification and taking into account that $w_1 \approx r_1$ for $r_1^2 / 2\sigma^2 \gg 1$, one then obtains:

$$p(w_1, \varphi) \approx \frac{1}{2\pi} \frac{1}{\sigma\sqrt{2\pi}} \exp\left(-\frac{(w_1 - r_1)^2}{2\sigma^2}\right)$$

The latter expression indicates that the argument is equally distributed over the segment $[0, 2\pi[$, while the module is approximately Gaussian, centered on $r_1$ and with standard deviation $\sigma$.

By using equations 5 and 6, the probability density of the measurements z (in modulus and argument form) and y is written according to equation 9:

$$p(z, y) = \frac{1}{2\pi} \frac{1}{\sigma\sqrt{2\pi}} \exp\left\{-\frac{(|z - re^{ix}| - r_1)^2}{2\sigma^2}\right\} \times \frac{1}{\sigma\sqrt{2\pi}} \exp\left\{-\frac{(y - 2r\cos(x))^2}{2\sigma^2}\right\}$$

Similarly, the following equation 9bis is obtained:

$$p(z, y) = \frac{1}{2\pi} \frac{1}{\sigma\sqrt{2\pi}} \exp\left\{-\frac{(|z - re^{ix}| - r_1)^2}{2\sigma^2}\right\}$$

$$\times \frac{1}{2\pi} \frac{1}{\sigma\sqrt{2\pi}} \exp\left\{-\frac{(|z' - r'e^{ix'}| - r')^2}{2\sigma^2}\right\}$$

At first glance, to estimate x, the estimator of the maximum likelihood could be implemented. Such an estimator maximizes the expression of equation 9 in x for given z, y, r, $r_1$.

This is equivalent to finding the estimator of x, denoted $\hat{x}$, using the following equation 10:

$$\hat{x} = \underset{x}{\text{ArgMin}}\left\{(|z - re^{ix}| - r_1)^2 + (y - 2r\cos x)^2\right\}$$

However, equation 10 is very nonlinear, and there is no analytical solution.

Conversely, since the signal-to-noise ratio is very good, $\hat{x}$ must verify the following approximations 11:

$$|z - re^{ix}| - r_1 \approx 0 \text{ and } y \approx 2r\cos\hat{x}$$

It is proposed to resolve each of the two equations of equation 11 separately so as to first find approximate values of the estimator $\hat{x}$.

Next, the following equations 12a and 12b are posed from the system of equations 11:

$$\begin{cases} F(z, x) = |z - re^{ix}| - r_1 = 0 \\ G(y, x) = y - 2r\cos x = 0 \end{cases}$$

The following equations 12a and 12b form a system to be solved, the solutions to which will respectively be called $\xi_1$ and $\xi_2$. The last step of the processing consists of "merging" $\xi_1$ and $\xi_2$ to determine the estimator $\hat{x}$.

It is now proposed to qualify the solutions $\xi_1$ and $\xi_2$ in number (ambiguities), mean and variance.

We are solving equation 12a, i.e., we are looking for $\xi_1$, which solves the following equation:

$$F(z, \xi_1) = 0$$

By using the fact that this expression is equivalent to $|z - re^{i\xi_1}|^2 = r_1^2$, the following equation 13 is obtained on the channel with interference:

$$|z|^2 + r^2 - r_1^2 - r(ze^{i\xi_1} + \bar{z}e^{i\xi_1}) = 0$$

Let us set out $|z| = \rho$, Arg $z = \alpha$.

Equation 13 is equivalent to $2\rho r \cos(\xi_1 - \alpha) = \rho^2 + r^2 - r_1^2$ Therefore, on the condition that $$-1 \leq \frac{\rho^2 + r^2 - r_1^2}{2\rho r} \leq 1,$$

there are two possible solutions for the estimate of the phase of the wanted signal in the channel with interference, which are expressed by the system of equation 14:

$$\xi_1 = \alpha \pm \text{Arccos}\frac{\rho^2 + r^2 - r_1^2}{2\rho r}$$

Where:

"arccos" designates the arccosine mathematical function.

where $\rho$ and $\alpha$ are respectively the modulus and the argument of z.

One of these estimators not being biased, the variance of the estimator is found as follows.

Let us set out $z=z_0+u$ (see equation 5), $\rho_0=|z_0|$ and $\alpha_0=\text{Arg}(z_0)$.

This makes it possible to define the quantities $\Delta\rho$ and $\Delta\alpha$ by the equations $\rho=\rho_0+\Delta\rho$ and $\alpha=\alpha_0+\Delta\alpha$.

When $|z_0|^2 \gg 2\sigma^2$, the following property is verified: the quantities $\Delta\rho$ and $\Delta\alpha$ are two independent, Gaussian, centered random variables, with respective variance $\sigma^2$ and $\sigma^2/|z_0|^2$.

From equation 14, another expression is obtained of the estimate of the phase of the wanted signal in the channel with interference, expression called equation 15:

$$\xi_1 = \alpha_0 \pm \Delta\alpha \pm \text{Arccos}\left[\frac{(\rho_0 + \Delta\rho)^2 + r^2 - r_1^2}{2r(\rho_0 + \Delta p)}\right]$$

Furthermore, we have:

$$\frac{(\rho_0 + \Delta\rho)^2 + r^2 - r_1^2}{2r(\rho_0 + \Delta p)} \approx \frac{\rho_0^2 + 2\rho_0\Delta\rho + r^2 - r_1^2}{2r(\rho_0 + \Delta p)}$$

By writing the limited development of the expression $$\frac{1}{\left(1 + \frac{\Delta\rho}{\rho_0}\right)}$$

to the first order in $\Delta\rho$, this expression is transformed into equation 16, or $$\frac{\rho_0^2 + r^2 - r_1^2}{2r\rho_0} + \frac{\Delta\rho}{r}\left(1 - \frac{\rho_0^2 + r^2 - r_1^2}{2\rho_0^2}\right)$$

From equation 15, and using the fact that the function arccos(t) can be derived on the interval ]−1;1[ and that its derivative is equal to $$\frac{-1}{\sqrt{1-t^2}},$$

it is deduced that:

$$\xi_1 = \alpha_0 + \Delta\alpha \pm \text{Arccos}\left(\frac{\rho_0^2 + r^2 - r_1^2}{2r\rho_0}\right) \pm \frac{\Delta\rho}{r}\left(\frac{\rho_0^2 - r^2 + r_1^2}{2\rho_0^2}\right)\frac{1}{\sqrt{1 - \frac{(\rho_0^2 + r^2 - r_1^2)^2}{4\rho_0^2 r^2}}}$$

Which is written in the form of equation 17:

$$\xi_1 = \alpha_0 + \Delta\alpha \pm \text{Arccos}\left(\frac{\rho_0^2 + r^2 - r_1^2}{2r\rho_0}\right) \pm \frac{\Delta\rho}{\rho_0}(\rho_0^2 - r^2 + r_1^2)\frac{1}{\sqrt{4\rho_0^2 r^2 - (\rho_0^2 + r^2 - r_1^2)^2}}$$

To understand the behavior of the term in $$\frac{\Delta\rho}{\rho_0},$$

it is possible to return to $z_0=re^{ix}+r_1 e^{ix_1}$ so as to involve only $r$, $r_1$, $x$ and $x_1$:

$$\rho_0^2 = |z_0|^2 = r^2 + r_1^2 + 2rr_1\cos(x-x_1)$$

From which results, on the one hand: $\rho_0^2 - r^2 + r_1^2 = 2r_1(r_1 + r\cos(x-x_1))$.

And on the other hand: $\rho_0^2 + r^2 - r_1^2 = 2r(r + r_1\cos(x-x_1))$.

This results in $$4\rho_0^2 r^2 - (\rho_0^2 + r^2 - r_1^2)^2 = 4r^2[r^2 + r_1^2 + 2rr_1\cos(x-x_1)] - 4r^2[r + r_1\cos(x-x_1)]^2$$

$$= 4r^2[r^2 + r_1^2 + 2rr_1\cos(x-x_1) - r^2 - r_1^2\cos^2(x-x_1) - 2rr_1\cos(x-x_1)]$$

$$= 4r^2[r_1^2 - r_1^2\cos^2(x-x_1)]$$

$$= 4r^2 r_1^2 \sin^2(x-x_1)$$

Equation 18 is deduced from this, which is a limited development of $\xi_1$ in $\Delta\rho$ and $\Delta\alpha$ expressed as a function of $x$ and $x_1$:

$$\xi_1 = \alpha_0 + \Delta\alpha \pm \text{Arccos}\left(\frac{\rho_0^2 + r^2 - r_1^2}{2\rho_0 r}\right) \pm \frac{\Delta\rho}{\rho_0}\frac{r_1 + r\cos(x - x_1)}{r\sin(x - x_1)}$$

The quantities $\Delta\alpha$ and $$\frac{\Delta\rho}{\rho_0}$$

are two independent, centered Gaussian noises with a same variance $$\frac{\sigma^2}{\rho_0^2} \text{ if } \frac{\sigma^2}{\rho_0^2} \gg 1.$$

One of the two determinations of $\xi_1$ is therefore not biased and with variance:

$$\text{var}(\xi_1) = \frac{\sigma^2}{\rho_0^2} + \frac{\sigma^2}{\rho_0^2} \cdot \frac{(\rho_0^2 - r^2 + r_1^2)^2}{4\rho_0^2 r^2 - (\rho_0^2 + r^2 - r_1^2)^2} =$$

$$\frac{\sigma^2}{\rho_0^2} \cdot \frac{4\rho_0^2 r^2 - (\rho_0^2 + r^2 - r_1^2)^2 + (\rho_0^2 - r^2 + r_1^2)^2}{4\rho_0^2 r^2 - (\rho_0^2 + r^2 - r_1^2)^2}$$

In the last two terms of the numerator, all of the terms to power 4 cancel one another out.

All the remains are the double products, namely:

$-2\rho_0^2 r^2 + 2r^2 r_1^2 + 2\rho_0^2 r_1^2 - 2\rho_0^2 r^2 - 2r^2 r_1^2 + 2\rho_0^2 r_1^2 = -4\rho_0^2 r^2 + 4\rho_0^2 r_1^2$ Taking the first term into account, the numerator is therefore reduced to $4\rho_0^2 r_1^2$.

Replacing the term $\rho_0$ with the term $\rho$, one obtains the variance of the estimator $\xi_1$ with equation 19, which follows:

$$\text{var}(\xi_1) = \frac{\sigma^2}{\rho^2} \cdot \frac{4\rho^2 r_1^2}{4\rho^2 r^2 - (\rho^2 + r^2 - r_1^2)^2}$$

Which can be rewritten as a function of x and $x_1$ in the following form:

$$\text{var}(\xi_1) = \frac{\sigma^2}{\rho^2} + \frac{\sigma^2}{\rho^2} \cdot \frac{(r_1 + r\cos(x - x_1))^2}{r^2 \sin^2(x - x_1)}$$

Let us solve equation 12b, according to which G(y, $\xi_2$)=y−2r cos $\xi_2$=0.

Two possible solutions are obtained for |y|/2r<1:

$\xi_2 = \pm \text{Arccos}(y/2r)$ where y=Re($\zeta$).

One of these estimators is not biased, and it is possible to find the variance of the estimator like before.

It is set out:

$y = y_0 + w$, with $y_0 = 2r \cos x$

In the normal case where w/2r<<1, the solutions of equation 12b are written according to the following equation 20:

$$\xi_2 = \pm \text{Arccos}(y_0/2r) \pm \frac{w}{2r} \frac{1}{\sqrt{1 - y^2/4r^2}}$$

Therefore, the variance of $\xi_2$ is expressed according to the following equation 21:

$$\text{var}(\xi_2) = \frac{\sigma^2}{4r^2 - y^2}$$

Thus, there are two possible candidates for $\xi_1$:($\xi_1^1$, $\xi_1^2$) and two possible candidates for $\xi_2$:($\xi_2^1$,$\xi_2^2$), or four possible values for the pair ($\xi_1$, $\xi_2$). Among these four pairs, in principle, only one corresponds to two values close to $\xi_1$ and $\xi_2$.

The ambiguity on the possible values for x is therefore lifted by taking the pair minimizing the deviation between $\xi_1^i$ and $\xi_2^j$.

The selected pair ($\xi_1^i$, $\xi_2^j$) is that which verifies the following rule:

$$|\xi_1^i - \xi_2^j| = \underset{k,l}{\text{Min}}|\xi_1^k - \xi_2^l|$$

Where i, j, k, l∈{1,2}

To simplify, the selected pair is denoted ($\xi_1$, $\xi_2$) hereinafter.

Furthermore, set out is $\sigma_1^2 = \text{var}(\xi_1)$ and $\sigma_2^2 = \text{var}(\xi_2)$.

It then remains to find $\hat{x}$ from $\xi_1$ and $\xi_2$.

To that end, it is proposed to estimate $\hat{x}$ by $\alpha\xi_1 + \beta\xi_2$ with $\alpha + \beta = 1$ such that $\hat{x}$ is not biased and so as to minimize the variance of $\hat{x}$:

$$\underset{\alpha,\beta}{\text{Min}}\text{var}(\hat{x}) = \underset{\alpha,\beta}{\text{Min}}(\alpha^2 \sigma_1^2 + \beta^2 \sigma_2^2)$$

The Lagrangian of this optimization problem is:

$L(\alpha,\beta) = \alpha^2 \sigma_1^2 + \beta^2 \sigma_2^2 - \mu(\alpha+\beta-1)$ The solution in ($\alpha$, $\beta$) is given by:

$$\begin{cases} 2\alpha\sigma_1^2 - \mu = 0 \\ 2\beta\sigma_2^2 - \mu = 0 \end{cases} \text{ or } \begin{cases} \alpha = \mu/2\sigma_1^2 \\ \beta = \mu/2\sigma_2^2 \end{cases}$$

$$\alpha + \beta = 1 \text{ gives } \frac{\mu}{2} \frac{\sigma_1^2 + \sigma_2^2}{\sigma_1^2 \sigma_2^2} = 1, \text{ or}$$

$$\mu = 2 \frac{\sigma_1^2 \sigma_2^2}{\sigma_1^2 + \sigma_2^2}$$

The expressions of the parameters $\alpha$ and $\beta$ are deduced from this according to the following equations 22:

$$\alpha = \frac{\sigma_2^2}{\sigma_1^2 + \sigma_2^2} \text{ and } \beta = \frac{\sigma_1^2}{\sigma_1^2 + \sigma_2^2}$$

Resulting in the expression of the desired estimate, which corresponds to the following equation 23:

$$\hat{x} = \frac{\sigma_2^2}{\sigma_1^2 + \sigma_2^2}\xi_1 + \frac{\sigma_1^2}{\sigma_1^2 + \sigma_2^2}\xi_2$$

Likewise, the expression of the variance of the desired estimate is deduced in the following equation 24:

$$\text{var}(\hat{x}) = \frac{\sigma_1^2 \sigma_2^2}{(\sigma_1^2 + \sigma_2^2)^2}(\sigma_1^2 + \sigma_2^2) = \frac{\sigma_1^2 \sigma_2^2}{(\sigma_1^2 + \sigma_2^2)}$$

Where, according to equations 19 and 21, $$\sigma_1^2 = \frac{\sigma^2}{\rho^2} \cdot \frac{4\rho^2 r_1^2}{4\rho^2 r_1^2 - (\rho^2 - r^2 + r_1^2)^2} \text{ and}$$

$$\sigma_2^2 = \frac{\sigma^2}{4r^2 - y^2}.$$

It has been demonstrated that the sub-steps for a first estimate, a second estimate, and selection make it possible to obtain an estimate of the phase in the fourth situation.

It should be noted that this reasoning is easily transposed to the case where the sampling frequency $f_{m2}$ is affected no longer by an internal interference, but an external interference, different from the first.

The measurement $\zeta$ is then written according to a different equation, namely the following equation 5bis:

$$\zeta = re^{ix} + r_2 e^{ix_2} + v$$

where $r_2$ and $x_2$ are respectively the phase and the modulus of a second interference, coming into play on a second sampling frequency.

The system of equations to be solved is then written according to the following equation 12bis:

$$\begin{cases} F(z, x) = |z - re^{ix}| - r_1 = 0 \\ F_2(\xi, x) = |\zeta - re^{ix}| - r_2 = 0 \end{cases}$$

The differences in phases relative to an antenna used as reference (differential phases) are then calculated.

The direction of arrival is next calculated from the differential phases.

For example, the calculation of the direction of arrival is carried out by an interferometry technique.

In each case, the method advantageously uses the approximations according to which:

$$|z - re^{ix}| - r_1 \approx 0 \text{ and } y \approx 2r \cos \hat{x}$$

The cases explicitly described correspond to the cases where the approximation is understood as an equality.

However, one skilled in the art understands that the method also works for an approximation relationship interpreted as an equality relationship to within a constant.

The equations to be solved are then the following:

$$\begin{cases} F(z, x) = |z - re^{ix}| - r_1 = A_1 \\ G(y, x) = y - 2r\cos x = A_2 \end{cases}$$

Where $A_1$ and $A_2$ are two constants.

Preferably, these two constants are negligible relative to the involved terms.

This results in other formulas sharing that the first estimate of the first pair of candidate phases $\xi_1^1$ and $\xi_1^2$ is estimated from the measurement z resulting from the mixture of the wanted signal, the first interference signal and noise, and that the second estimate of the second pair of candidate phases $\xi_2^1$ and $\xi_2^2$ is estimated from the measurement $\zeta$ resulting from the mixture of the wanted signal, the second interference and noise.

The method therefore makes it possible to determine the direction of arrival in the presence of aliasing.

More specifically, the described method is based on the development of an explicit model of the measurements with interferences as well as processing to extract the phase of the wanted signal from measurements with interferences.

The method has the advantage of being easy to carry out.

The invention claimed is:

1. A method performed by a device configured to determine a direction of arrival of radio signals in the presence of aliasing by using an interferometric array with four antennas with identical diagrams, and by a controller configured to sample two distinct sampling frequencies per antenna, the aliasing being such that in a time-frequency representation of a signal, the signal being a wanted signal, a maximum of one antenna is affected by an interference phenomenon on the two sampling frequencies of the one antenna, the interference phenomenon being due to a first external interference and a second interference, the second interference being either a second external interference or an internal interference, the method comprising:
receiving the signal by each antenna,
sampling, by the controller, the signals received on each of the four antennas according to two sub-Nyquist frequencies forming the set $\{f_1, \text{perm}(f_1); f_2, \text{perm}(f_2); f_3, \text{perm}(f_3); f_4, \text{perm}(f_4)\}$, wherein $f_1, f_2, f_3$ and $f_4$ are four distinct sub-Nyquist frequencies and perm is a permutation of the set $\{f_1, f_2, f_3, f_4\}$, such that the signals received on two distinct antennas are sampled by two distinct pairs of sub-Nyquist sampling frequencies,
applying, by the controller, a spectral analysis using a discrete Fourier transform during a synchronous acquisition period over all of the samplings to obtain 2P time-frequency grids, each element of a time-frequency grid containing a complex vector being a measurement, and
detecting the presence or absence of a wanted signal at a plurality of frequencies,
wherein for all of the detected wanted signals, the method further comprises:
determining an interference situation for each antenna,
determining, for the antennas other than the antenna affected by a double interference, a phase of the wanted signal, and
determining, for any antenna affected by the double interference, an estimate of the phase of the wanted signal, wherein determining the estimate comprises:
estimating a first estimate of a first pair of candidate phases $\xi_1^1$ and $\xi_1^2$ from a measurement z resulting from a mixture of the wanted signal, a first interference signal, and noise,
estimating the second estimate of a second pair of candidate phases $\xi_2^1$ and $\xi_2^2$ from a measurement $\zeta$ resulting from a mixture of the wanted signal, a second interference signal, and noise, and
selecting phase values from among a candidate phases to obtain the estimate of the phase of the wanted signal on the antenna affected by the double interference.

2. The method according to claim 1, wherein the detected plurality of frequencies comprise analog frequencies regularly spaced apart by a frequency interval that is a inverse of an acquisition time.

3. The method according to claim 1, wherein the first estimate of first candidate phases includes calculating the following equations:

$$\xi_1^1 = \alpha + \text{Arccos}\frac{\rho^2 + r^2 - r_1^2}{2\rho r} \text{ and}$$

$$\xi_1^2 = \alpha - \text{Arccos}\frac{\rho^2 + r^2 - r_1^2}{2\rho r}$$

wherein:
α is an argument of the measurement z,
ρ is a modulus of the measurement z,
r is a modulus of the wanted signal, and
$r_1$ is a modulus of the first interference signal.

4. The method according claim 1, wherein the second estimate of a second pair of candidate phases includes calculating equations based on a nature of the second interference,
wherein when the second interference is the internal interference, the equations being $\xi_2{}^1{}_2 = \text{Arc}\cos(y/2r)$ and $\xi_2{}^2 = -\text{Arccos}(y/2r)$ wherein:
r is a modulus of the wanted signal, and
y is a real part of the measurement ζ, and
wherein when the second interference is the second external interference, the equations being $$\xi_2^1 = \alpha + \text{Arccos}\frac{\rho_2^2 + r^2 - r_2^2}{2\rho_2 r} \text{ and}$$

$$\xi_2^2 = \alpha - \text{Arccos}\frac{\rho_2^2 + r^2 - r_2^2}{2\rho_2 r}$$

wherein:
α is a argument of the measurement ζ,
$\rho_2$ is a modulus of the measurement ζ,
r is the modulus of the wanted signal, and
$r_2$ is a modulus of the second interference signal.

5. The method according to claim 1, wherein selecting phase values includes:
associating candidate phases to determine the two phase values corresponding to a shared value representing a true phase, and to obtain two associated phase measurements, and
estimating the phase by merging the two associated phase measurements.

6. The method according to claim 5, wherein associating the candidate phases further comprises:
associating the pair of candidate phases $\xi_1{}^i$ and $\xi_2{}^j$ if the pair of candidate phases $(\xi_1{}^i, \xi_2{}^j)$ is the pair from among the four pairs $(\xi_1{}^k, \xi_2{}^l)_{k \in \{1,2\}, l \in \{1,2\}}$ that verifies $$|\xi_1^i - \xi_2^j| = \underset{k,l}{\text{Min}}|\xi_1^k - \xi_2^l|.$$

7. The method according to claim 5, wherein estimating the phases further comprises calculating:

$$\hat{x} = \frac{\sigma_2^2}{\sigma_1^2 + \sigma_2^2}\xi_1 + \frac{\sigma_1^2}{\sigma_1^2 + \sigma_2^2}\xi_2$$

wherein:
$\hat{x}$ is the estimate of the phase of the wanted signal;
$\xi_1$ is equal to $\xi_1{}^i$ obtained in the association step;
$\xi_2$ is equal to $\xi_2{}^j$ obtained in the association step;
$\sigma_1{}^2$ is a variance of $\xi_1$, defined by $$\sigma_1^2 = \frac{\sigma^2}{\rho^2} \cdot \frac{4\rho^2 r_1^2}{4\rho^2 r^2 - (\rho^2 + r^2 - r_1^2)^2},$$

and
$\sigma_2{}^2$ is a variance of $\xi_2$, defined:
when the second interference is internal, by $$\sigma_2^2 = \frac{\sigma^2}{4r^2 - y^2},$$

or
when the second interference is external, by $$\sigma_2^2 = \frac{\sigma^2}{\rho_2^2} \cdot \frac{4\rho_2^2 r_2^2}{4\rho^2 r^2 - (\rho_2^2 + r^2 - r_2^2)^2}.$$

8. The method according to claim 1, wherein the method further includes:
calculating differential phases, and
calculating the direction of arrival from differential phases.

9. A device for determining the direction of arrival of radio signals in the presence of aliasing, the device comprising:
an interferometric array with four antennas with identical diagrams, each antenna configured to receive a signal, and
a controller configured to sample two distinct sampling frequencies per antenna, the aliasing being such that in a time-frequency representation of a signal, the signal being a wanted signal, a maximum of one antenna is affected by an interference phenomenon on the two sampling frequencies of the one antenna, the interference phenomenon being due to a first external interference and a second interference, the second interference being either a second external interference or an internal interference,
wherein the controller is further configured to sample the signals received on each of the four antennas according to two sub-Nyquist frequencies forming the set {$f_1$, perm($f_1$); $f_2$,perm($f_2$); $f_3$,perm($f_3$); $f_4$, perm($f_4$)}, wherein $f_1$, $f_2$, $f_3$ and $f_4$ are four distinct sub-Nyquist frequencies and perm is a permutation of the set {$f_1$, $f_2$, $f_3$, $f_4$}, such that interferometric array samples the signals received on two distinct antennas using two distinct pairs of sub-Nyquist sampling frequencies, and
wherein the controller is further configured to:
apply a spectral analysis using a discrete Fourier transform during a synchronous acquisition period over all of the samplings to obtain 2P time-frequency grids, each element of a time-frequency grid containing a complex vector being a measurement,
detect the presence or absence of a wanted signal at a plurality of frequencies, wherein for all of the detected wanted signals, the controller is further configured to:
  determine an interference situation for each antenna,
  determine, for the antennas other than the antenna affected by a double interference, a phase of the wanted signal, and
  determine, for any antenna affected by the double interference, an estimate of the phase of the wanted signal,
wherein the controller is further configured to determine the estimate by:
  estimating a first estimate of a first pair of candidate phases $\xi_1^1$ and $\xi_1^2$ from a measurement z resulting from a mixture of the wanted signal, a first interference signal, and noise,
  estimating the second estimate of a second pair of candidate phases $\xi_2^1$ and $\xi_2^2$ from the measurement $\zeta$ resulting from a mixture of the wanted signal, a second interference signal, and noise, and
  selecting phase values from among a candidate phases to obtain the estimate of the phase of the wanted signal on the antenna affected by the double interference.

10. The device according to claim 9, wherein the controller further comprises:
  a sampling unit configured to sample the signals received on each of the four antennas, and
  a computer configured to apply the spectral analysis, detect the presence or absence of the wanted signal, and, for each detected wanted signal, determine the interference situation for each antenna, extract the phase of the wanted signal on the antennas other than the antenna affected by the double interference, and estimate the phase of the wanted signal for any antenna affected by the double interference.

11. The device according to claim 10, wherein the sampling unit includes two analog-digital converters per antenna.

* * * * *